(12) United States Patent
Gysi

(10) Patent No.: US 6,828,523 B1
(45) Date of Patent: Dec. 7, 2004

(54) METHOD AND DEVICE FOR THE FORMATION OF PIPES

(75) Inventor: Peter Gysi, Bellikon (CH)

(73) Assignee: Elpatronic AG, Bergdietikon (CH)

( * ) Notice: Subject to any disclaimer, the term of this patent is extended or adjusted under 35 U.S.C. 154(b) by 81 days.

(21) Appl. No.: 10/110,588

(22) PCT Filed: Aug. 25, 2000

(86) PCT No.: PCT/CH00/00454

§ 371 (c)(1),
(2), (4) Date: Apr. 12, 2002

(87) PCT Pub. No.: WO01/30529

PCT Pub. Date: May 3, 2001

(30) Foreign Application Priority Data

Oct. 22, 1999 (CH) .............................................. 193499

(51) Int. Cl.[7] ...................... B23K 26/00; B23K 26/08; B23K 37/047
(52) U.S. Cl. ........................... 219/121.13; 219/121.63; 228/17.5; 72/368
(58) Field of Search ....................... 219/121.63, 121.64, 219/121.85, 121.6, 121.82, 121.83, 121.13, 121.14, 121.31, 121.32; 72/367.1, 368, 715; 228/17, 17.5, 144, 146, 147, 149, 150, 151

(56) References Cited

U.S. PATENT DOCUMENTS

| 4,497,995 A | * | 2/1985 | Nilsen ................... 219/121.63 |
| 4,800,250 A | * | 1/1989 | Watanabe et al. ...... 219/121.63 |
| 4,830,258 A | * | 5/1989 | Lentz et al. ............... 228/17.5 |
| 5,017,075 A | * | 5/1991 | Block ......................... 212/319 |
| 5,060,840 A | * | 10/1991 | Lentz et al. ............... 228/49.6 |

FOREIGN PATENT DOCUMENTS

| CH | EP A 0211970 | * | 8/1985 |
| CH | WO A 9944783 | * | 3/1998 |
| CH | WO A 0029163 | * | 11/1998 |
| DE | 3920715 A1 | * | 6/1989 |
| FR | EP A 0245145 | * | 4/1987 |

* cited by examiner

Primary Examiner—Samuel M. Heinrich
(74) Attorney, Agent, or Firm—McCormick Paulding & Huber LLP

(57) ABSTRACT

A method for the manufacture of welded tubes is provided. The tube bodies are produced in a press or rounding apparatus and are fed to a welding machine, such as a laser or electron beam type welding machine. The tube is formed when the edges of the tube bodies are welded together. The method includes the transfer of the tube bodies from the press or rounding apparatus to the draw-in of the welding machine. One or more transfers modules, each having a separate drive, are used to convey the tube bodies. The one or more transfer modules, which are operated by a common control arrangement, are controlled so that the intermittently formed tube bodies are presented at the draw-in to the welding machine in as nearly continuous a sequence as possible.

2 Claims, 3 Drawing Sheets

METHOD AND DEVICE FOR THE FORMATION OF PIPES

CROSS REFERENCE TO RELATED APPLICATION

Applicant hereby claims foreign priority benefits under 35 U.S.C. § 119 of Swiss Patent Application No. 1934/199 filed 22 Oct. 1999 and PCT Application No. PCT/CH00/00454, filed 25 Aug. 2000, the disclosure of which is herein incorporated by reference.

BACKGROUND OF THE INVENTION

1. Technical Field

This invention relates to methods for manufacturing welded tubes in general, and to methods for manufacturing welded tubes that include the transfer of tube bodies between a forming apparatus and a welding machine.

2. Background Information

There exists an increasing demand for a production plant for internal high pressure forming ("hydroforming") of elongated, longitudinally closed, essentially tubular bodies for the production of shaped parts. These bodies may be configured as tubes or hollow bodies with rotationally asymmetrical, or only partly rotationally symmetrical, cross-sections, and may be used for the widest variety of purposes. If the shaped parts fabricated by hydroforming are used, e.g., in a body structure of a car or lorry or other vehicle, the quality of the outer skin of the shaped parts is becoming increasingly important, as these are increasingly used as body components and are therefore visible on the finished body. Today, tubes with a length of approximately one (1) meter to four (4) meters and with diameter-to-thickness ratios of sixty (60) or more are being used for this purpose. However, it is likely that the lengths will continue to increase, and may exceed, e.g., five (5) meters, while the diameter-to-thickness ratios drop to forty (40) or less and also increase to one hundred (100), one hundred and fifty (150) or more. It is moreover likely that rotationally asymmetrical bodies will also be used, e.g., bodies with elliptical or oval cross-sections with partially flattened or parallel side wall parts, and/or bodies with rectangular or triangular cross-sections. The cross-section is governed by the specific application, which may demand every possible cross-sectional shape.

The initial material for such bodies to be processed by hydroforming into shaped parts is a flat sheet-metal blank which constitutes the shell of the future body. The blank is formed in a press or rounding apparatus into an elongated tubular body, which is not longitudinally closed, as the corresponding sheet-metal edges are adjacent but are not yet joined together. Joining is done by welding with an energy beam such as a laser or by some other suitable welding process while the longitudinal edges are held in the butt position. The quality of the weld seam is subject to special requirements, e.g., as to its fluid tightness and elasticity during the ensuing hydroforming.

Generally speaking, elongated welded tubular bodies need to be fabricated with a high quality welded joint and, depending on the application, with a high-quality outer skin, as scratches or indentations on the shaped parts are undesirable or unacceptable. Therefore the basic problem of the invention is to provide methods and apparatuses with which elongated tubular bodies, in particular with a high-quality outer skin, can be produced efficiently.

DISCLOSURE OF THE INVENTION

Hereinafter where mention is made of "tubes", "tube bodies", etc., these are to be understood as signifying elongated tubular bodies with variously configured cross-sections according to the remarks made above.

A method for the manufacture of welded tubes is provided. The tube bodies are produced in a press or rounding apparatus and are fed to a welding machine, such as a laser or electron beam type welding machine. The tube is formed when the edges of the tube bodies are welded together. The method includes the transfer of the tube bodies from the press or rounding apparatus to the draw-in of the welding machine. One or more transfer modules, each having a separate drive, are used to convey the tube bodies. The one or more transfer modules, which are operated by a common control arrangement, are controlled so that the intermittently formed tube bodies are presented at the draw-in to the welding machine in as nearly continuous a sequence as possible.

Through the provision between the equipment for forming the tube bodies—(which may be a press that forms the tube bodies in a number of bending steps, or a rounding apparatus)—on the one hand, and the welding machine on the other hand, of a number of transfer modules which are actuated by a common control so that the transfer modules can constitute a buffer between the equipment for forming the tube bodies and the actual welding machine, it becomes possible to harness an intermittent tube body production to a continuous welding operation. For example, three short tube bodies or one long tube body can be formed simultaneously in a press, and by slowing and/or accelerating individual tube bodies in the transfer line, can be arranged into a series of tube bodies that is as continuous and as closely spaced as possible on running through the welding zone.

With a continuous feed of tubes, it is also possible to configure the transfer line so that the tubes are presented in the welding zone for an optimal length of production run.

In accordance with a further aspect, an effort is made to transfer the tube bodies in such a way that their outer skin remains free from damage, and also in particular, that correct orientation of the edges is preserved during transfer, if need be with an initial squeezing of the tube body with a view to a subsequent closure of the gap in the welding area. Squeezing of the tubes may be advisable because after the plastic forming of the blank into a tube there is an elastic springback which opens up the gap between the edges somewhat. Also, the gap may be narrow enough or not quite narrow enough, depending on the method used for forming the blank. Furthermore, the use of different sheet-metal alloys and/or thicknesses on one and the same plant can result in different gaps, and this may need correcting in the subsequent processing of the tubular body.

The present method provides substantially damage-free transfer between the press or rounding apparatus and the welding machine by carrying the tube bodies on the inside of the tube during the transfer.

Supporting the bodies from inside protects the outer skin from damage. Means for locating the edges during transfer can also operate internally, or on the edges themselves. Such locating means, e.g., in the form of internally acting rollers and/or leaf spring devices acting on the edges, are advantageous in bringing the tube body to the draw-in to the welding machine ready orientated, so that at that point only slight adjustments of alignment are necessary in addition to the closure of the tubular body. It is also preferred that there be a facility for partially closing the gap in the body while transfer is still taking place, preferably by externally acting drive rollers whose mutual position is adjustable.

It is also desirable to ensure smooth, e.g., jolt-free, run-in of the tube bodies at the draw-in to the welding machine, or as they are passed from the transfer apparatus to the welding machine; even if the transfer apparatus does not assist further closure of a tube to be supplied which is inherently too wide open. It should be possible for the welding machine to handle the widest possible variety of tube dimensions and gap widths. Furthermore, it is advantageous that the quality of the outer skin of the tube should not be impaired by this operation.

The present method utilizes a draw-in means, in particular draw-in rollers, which receive the tube body in an open position of the draw-in means and then close to a predetermined setting to reduce the gap opening of the body and preferably to contact the body so as to advance it. The draw-in means move back to the open position after the body has passed through.

As the draw-in means are in an open position when they receive the tube body, abrupt impact of the body on these means, possibly damaging the outer skin, does not occur. The closing of the draw-in rollers to the predetermined setting, triggered by a tube body sensor, can be effected relatively gently so that the draw-in means or rollers, which are preferably plastic-coated or made of plastic material, do no damage to the outer skin of the body. In seizing the tubular body the draw-in means partially close the body while advantageously applying the force needed to propel the body through further stations of the welding machine as far as the next propelling means in the conveying direction.

In the manufacture of welded tubes, it is preferable to at least partly close the gap in the tube bodies before they reach the welding tool; advantageously, this should be done without damaging the outer skin of the bodies. The present method accomplishes this by at least largely closing the open body edges in the welding machine using a tool acting externally on the body with a predetermined setting. Preferably, the tool has a floating mount and/or assumes a basic position through spring force. In these embodiments, because the tool acting externally on the tube body to close the edges has a floating mount, it is able to follow any movements of the bodies about their longitudinal axis, and this largely excludes the possibility of damage to the outer skin of the body.

The tool is preferably adjustable over the circumference of the tube body, and of course adjustable in such a way that the object of largely closing up the edges is realized through a continuous, narrowing squeezing together of the body. This squeezing together is preferably performed against a tapering element that sets the edge-closure by plunging into the body, travelling with the body if need be, and (if so) provided with its own drive if need be. The edges must bear on this element, though not with large transverse forces. As the wall thickness of the tube bodies is variable, the transverse forces must also be adjustable, which is realized by setting the tool to the tapering diameter required. The tool may apply pressure to the body, e.g., by means of pneumatic cylinders.

At this juncture, a point should be noted that applies in principle to all stations in the welding plant: as the tube runs through, its shape changes in a way that is non-uniform over its length. If, say, the middle of a long tube is in the tool described above, a portion of the leading end is already welded, while the trailing end has a fully open gap. If the reshaping from front to rear is linear, it is so only by chance; the tube warps over its length, which adversely affects the position of the edges to be welded. What is more, the warping changes as welding progresses. Also, the warping is dependent on, e.g., the length, material and thickness of the tube. In other words, the tube is "alive" during processing, which may in particular compromise the edge position that is required for welding.

Another issue that must be addressed in the manufacturing of tubes is that the edges to be welded must be guided to a correct position for welding. The welding requires an edge closure with an extremely small tolerance, which in the case of laser welding for example amounts to only 0.08 mm.

The present method addresses this issue by utilizing a closing tool with one or more, preferably exchangeable, modules. Each module has rollers that are arranged in a ring and are adapted to the tube cross-section. At least one of the rollers is adjustably mounted so that, over its range of adjustment no damage is caused to the tube body, especially to the outer skin thereof, by its action on the body, owing to the change in position.

Through provision in the welding zone of a welding tool formed from modules with rings of rollers, the requisite number of rollers can be provided for each sheet-metal thickness and grade. These rollers may be driven, and have the particular function of setting a defined edge position during welding.

Preferably, spring-mounted lower rollers may be provided to effect a squeezing together of the tube body edges to close the gap as nearly completely as possible, but at least to within the range of tolerance for laser welding. Squeezing the edges together evens out cuffing variations or waviness of the edges, but on the other hand it usually causes V-shaped splaying of the edges, which may be undesirable. This can be prevented by the upper rollers, which guide and/or press the edges so that the edge faces are in contact with each other. The preferred mounting for the upper and lower rollers is one which prevents the rims of the waisted rollers from leaving impressions in the tube body surface.

By providing a plurality of modules, various actions can be performed on the tube body by means of the rollers of these modules and a good adaptation can be made to tubes that are difficult to Weld (owing to material, dimensions, surface coating) by adding or removing modules to obtain an optimal effect on the tube body.

After welding, there is usually an inspection of the welded joint or seam quality. It is preferred that a drive be provided, preferably in the form of a further roller ring module, to advance the tube into the zone where the (usually optical) inspection of seam quality takes place, so that the tube is guided and driven in this area also, this being beneficial for the inspection, which is sensitive to vibrations, i.e. reacts to positional fluctuations (positional variations) of the seam.

BRIEF DESCRIPTION OF THE DRAWINGS

Embodiments of the invention will now be described in detail by way of example, with the aid of the drawings.

DETAILED DESCRIPTION OF THE INVENTION

Figure 1:
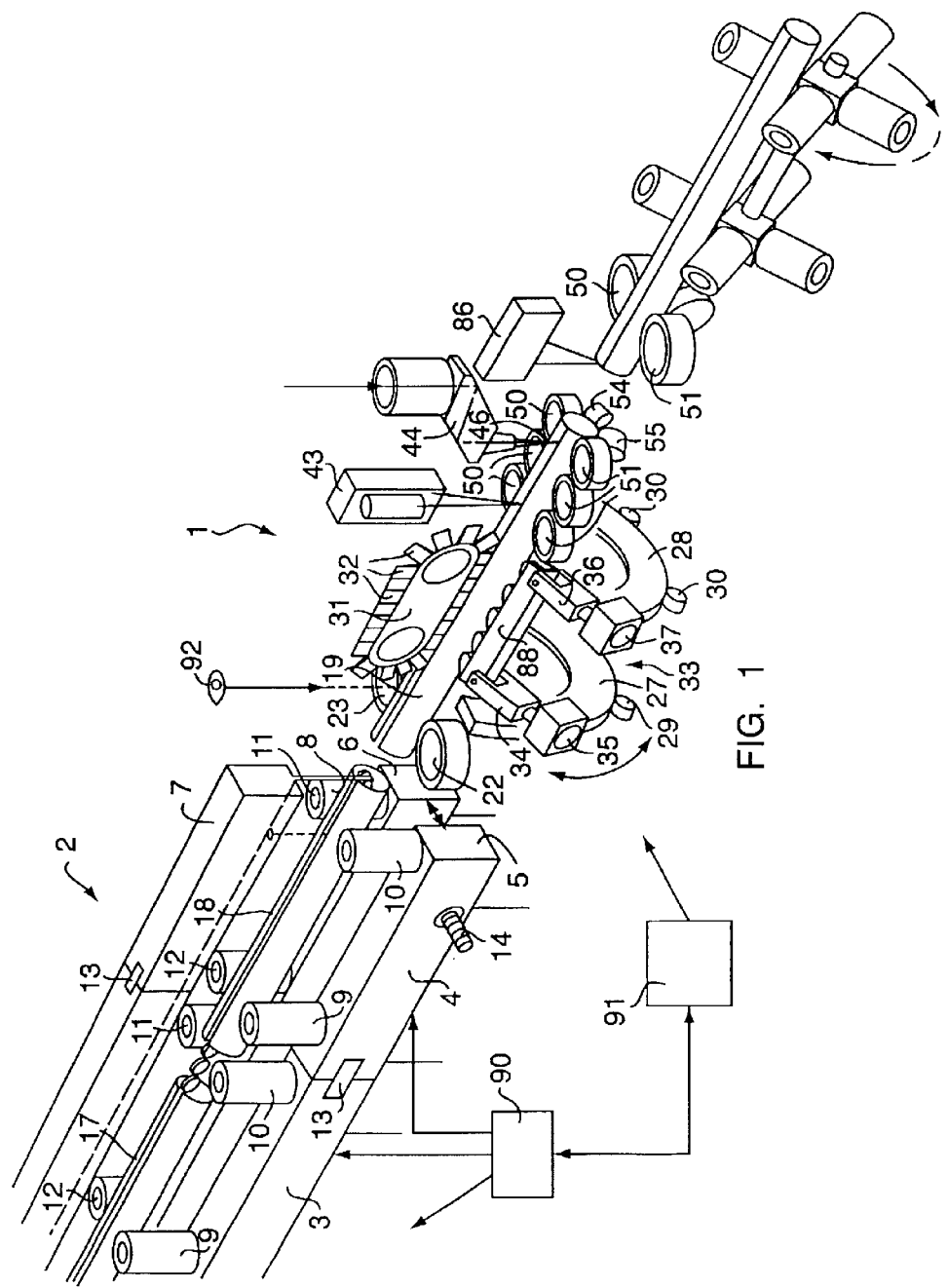
FIG. 1 shows a schematic three-dimensional representation of a welding plant.

FIG. 1 shows a welding plant 1 with a transfer apparatus 2 and a welding machine in a highly simplified three-dimensional view. The methods employed and the apparatuses will be described in detail with reference to FIG. 1. Individual methods and/or devices are shown in more detail in FIGS. 2 to 5, and will be described with the aid of these figures. The welding plant should preferably be used for welding tubes that are intended for subsequent hydroforming and end up as shaped parts. These tubes, or the shaped parts produced from them, are used, e.g., in motor-vehicle construction. The outer skin of the tube bodies, usually consisting of a coating, must not be harmed, so that the coating remains intact on the shaped part.

In FIG. 1, the reference numeral 2 denotes the general arrangement of a transfer apparatus. The transfer apparatus of the welding plant brings individual tube bodies from a press (not shown) or rounding apparatus (not shown)—known facilities which form tube bodies from flat sheet-metal blanks—to the actual welding machine. The transfer apparatus 2 is formed from individual modules, only two such modules 3 and 4 being shown in the drawing. Each of the modules is designed as a separate unit to convey tube bodies with an independent drive. To convey the tube bodies from the press or rounding apparatus to the welding machine, several such modules, e.g., five, are usually coupled together to jointly form a transport path for the bodies. In FIG. 1 the coupling is suggested by elements 13 not shown in detail. Each of the modules may, e.g., have feet with rollers (also suggested only) so that individual modules, or a number of modules, can easily be taken out of the transport path. The figure also shows two bodies 17 and 18 being conveyed over the conveyor path formed by the modules to the welding machine. The individual drives of the modules are controlled by a common control 90 whose presence is only suggested in the figure and whose connection to the module drives (which are not shown) is represented merely by lines symbolizing electrical leads. Such a control can be constructed in the conventional way by an expert in the field of controls. By means of the individual modules, each module being separately operable and/or individually adjustable in its speed profile for rate of feed, the tube bodies can be buffered before reaching the actual welding machine, so that a transition can be made from intermittent operation, such, as prevails at the press or rounding apparatus (also referred to as a forming apparatus), to continuous operation, as required for the welding machine. The length of the transfer apparatus is determined by the number of modules to allow the various operating speeds and the intermittent press operation to be adapted to the continuous operation of the welding machine. For example, five modules can be connected together to make a transfer apparatus which has a length of five meters and delivers the bodies coming intermittently from the press to the welding machine as a series spaced at regular and very short intervals. The press may produce different body lengths, e.g., a series of three short tubes or one long tube, and these tubes may be buffered accordingly in the transfer apparatus. Other configurations are also possible.

Figure 2:
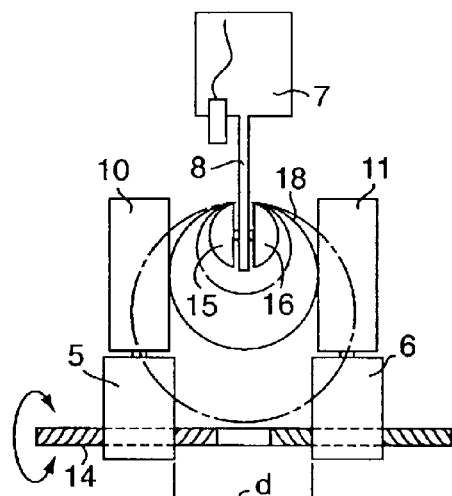
FIG. 2 is a frontal view of the feed through opening of a module of the transfer apparatus.

In the example shown, the tube bodies are conveyed in the modules, or transfer apparatus, on a carrier plate 8 projecting downwards from an upper carrier 7 of each module and engaging in the opened body. In FIG. 1 the carrier plate is shown as if it were transparent, in order to reveal tube body parts and drive rollers located behind it. FIG. 2 is a view from in front, looking the opposite way to the conveying direction, of the module 4 of the transfer apparatus, in which the plate 8 engaging in the body 18 is again visible. The plate 8 preferably extends over the whole length of the module, so that when modules are coupled together a continuous plate 8 for the tube bodies is formed. The carrier 7 and the remaining elements of each module are arranged on corresponding support frames which form a rigid unit for each module, and on which the feet (not shown in detail) of each module are also arranged. FIG. 2 shows that rollers 15 and 16 on which the tube body 18 and of course further conveyed bodies run are arranged on the plate 8 inside the body 18. Instead of the dome-shaped rollers shown, rollers standing out horizontally from the plate, or rails on which the tube bodies run, could of course be provided. In any case, the bodies are preferably supported by internal elements, as the intention is to keep the outer skin of the bodies as free as possible from scratches, kinks or other damage. The plate 8 also serves as centering means for the bodies, keeping the position of their edges essentially constant during transport in the transfer apparatus, and preventing rotational drifting. Special centering means can also be provided on the plate 8, such as leaf springs projecting slightly from the plate which act on the edges of the bodies to keep them in as uniform a position as possible. The springs may also serve to prevent contact of the body edge over the whole length of the plate 8, and thus to reduce friction during conveying. The drive for conveying the tube bodies is preferably formed by rollers 9 to 12 which are driven by motors in the drive gearboxes 5 and 6 of the module, the drive speed being determined by the control 90, as previously explained. The rollers, which, are preferably vertically arranged, i.e. the rollers 10 and 11 of FIG. 2 for example, consist of a plastic material preventing the outer skin of the body from being scratched on being driven by the rollers. Preferably, the gap "d" between the rollers is adjustable so that the modules of the transfer apparatus can be set to different body diameters, as suggested in FIG. 2, which shows a spindle 14 with opposing threads for adjusting the gap between the rollers. In addition to the body 18 drawn in the figure, two further body diameters are shown in broken lines. These represent, e.g., the smallest and largest bodies that can be conveyed by the transfer apparatus. The presence of a body in each module can be detected by a sensor, suggested in FIG. 2 only.

Figure 3:
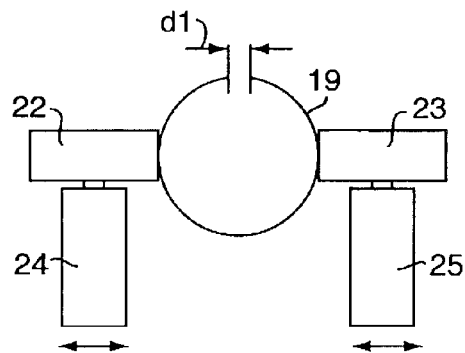
FIG. 3 is a frontal view of the feed through opening of a module of the draw-in device of the welding machine.
Figure 4:
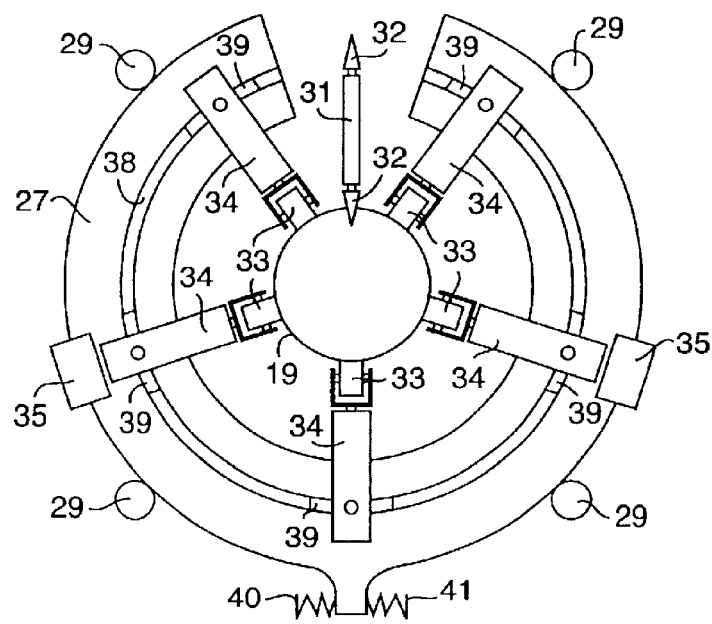
FIG. 4 is a frontal view of the feed through opening of the tool.

The tube body having been conveyed by the transfer modules reaches the point of entry to the actual welding machine. Here a draw-in device is shown which in the illustrated example comprises the rollers 22 and 23. The rollers on one side are drivable in rotation to pick up the bodies from the transfer apparatus and convey them through the welding machine. FIG. 3, in another schematic view, shows the body 19 being acted on by the draw-in rollers 22 and 23. These rollers are driven by drive motors 24 and 25, and likewise consist of plastic material or have a plastic coating, again in order not to damage the outer skin of the body at this point. The rollers also assume the function of a first reduction stage for the gap "d1" in each body. This involves parting the rollers in an open position at a distance greater than the diameter of the body exiting from the transfer apparatus. Thus the rollers are moved away from the body, as indicated by the arrows in FIG. 3, to accept the individual body between the rollers without contact with the rollers. This avoids the rollers coming abruptly into contact with the tube bodies and partially closing them forcibly, which could cause damage to the outer skin of the bodies. A sensor 92 above the rollers, suggested in FIG. 1, detects the entry of a body between the rollers. After entry, the rollers are brought into contact with the tube, closing it, and setting the gap "d1" to a predetermined size which is dictated inter alia by the ensuing tool. This involves moving the rollers towards each other as indicated by the arrows in FIG. 3. For this purpose the rollers may be arranged on swivel arms (not shown) which are moved, e.g., pneumatically or hydraulically and carry the rollers with their drive motors 24 and 25.

The body, with its gap now reduced to a predetermined size, is then fed to a tool which effects a continuous, narrowing, further closure of the gap in the tube. For this purpose a limit stop 31 may be provided which plunges into the tube and which consists, e.g., of individual elements 32 that project into the body and circulate at the same speed as that at which the body is conveyed. These elements converge to a pointed tip, so that by arranging the entire limit stop 31 so that it slopes upwards with respect to the longitudinal axis of the tube, the result is a limit stop that becomes narrower as it travels along with the tube. The tube body is externally pressed by tools 33 against the limit stop, or, in the absence of such a stop, against the other edge, so that either contact occurs or only a small tolerance remains between the stop and the body edges. In the illustrated example the tool has roller bars 88 with a large number of rotatable rollers arranged thereupon that act on the tube. The roller bars 88, which are arranged on brackets 34 and 36, can be adjusted in their position and, e.g., pressed against the tube pneumatically by adjusting means 35 and 37 so that the tube bears on the tapering limit stop. The tools 33 are preferably arranged to float so that they are able to follow any movement of the tube about its longitudinal axis. Indeed, if a tube is not properly orientated as it passes into the tool, it is brought into contact with the stop faces during the closing operation and is thereby aligned in its edge position. The result, if the roller bars 88 do not have a floating mount, is slippage between tube and roller bars 88 about the longitudinal axis of the tube. The effect of the floating mount is that scratching of the tube is reliably precluded, and uniform pressing conditions prevail even if the tube, which may be a long one, makes further autonomous movements. Hence, the tool closes the gap while aligning the edges to be welded, this closure being continuous, tapering, and accurately aligned. The individual tools 33 with their brackets 34 and adjusting and/or pressure-generating means 35 are freely positionable around the tube body. This can be seen from FIG. 4, in which a round support 27 in the shape of a segment of a circle is shown, which surrounds the body 19 and has a groove 38 on which the individual tools 33 to 35 can be slid and positioned by means of mountings 39. The number of such tools (five) shown in FIG. 4 can of course be varied. The entire support 27 floats on rollers 29 attached to the machine frame (not shown), so that the support 27 and with it the tools 33 can shift about the longitudinal axis of the body 19, or in other words, the tools effectively have a floating mounting. This is, of course, also the case for the other support 28 which is shown in FIG. 1 and which supports the other end of the tool 33, so that the entire tool is able to adapt itself to the tube body. Preferably, spring means 40 and 41 are provided which whilst allowing rotational shifts of the support 27 (or 28), restore the support 27 and its tools to a basic position, ready for the next body, after the body 19 exits from the tool.

After leaving the tool which has just been described, the tube body, with its gap already largely closed, passes into the welding tool proper. This is represented schematically in FIG. 1 by the rollers 50, 51 and 54, 55. For a more detailed description it will be necessary to refer to FIG. 5. These rollers also have a modular arrangement, with each ring of rollers forming in itself a module that can be separately driven, (as will be explained in detail presently), can be separately moved, and can even be separately removed from the welding machine or added. The roller rings can be arranged in corresponding mountings on the machine frame and can, e.g., be made to travel on rails to facilitate their removal or replacement. An edge monitoring unit 43 (see FIG. 1) which detects the position of the edges, e.g., by an optical technique can be arranged before the welding point. Such a unit for obtaining the correct butted position of two metal sheets is shown in EP Patent Application Serial No. 97109160.8

In accordance with this edge position detection, the welding tool can then be operated, as will be described later; and/or the welding beam 46—which, from a welding beam source 45 (not shown) is brought to bear on the workpiece via a welding beam guide 44 (only schematically suggested)—can be influenced.

Figure 5:
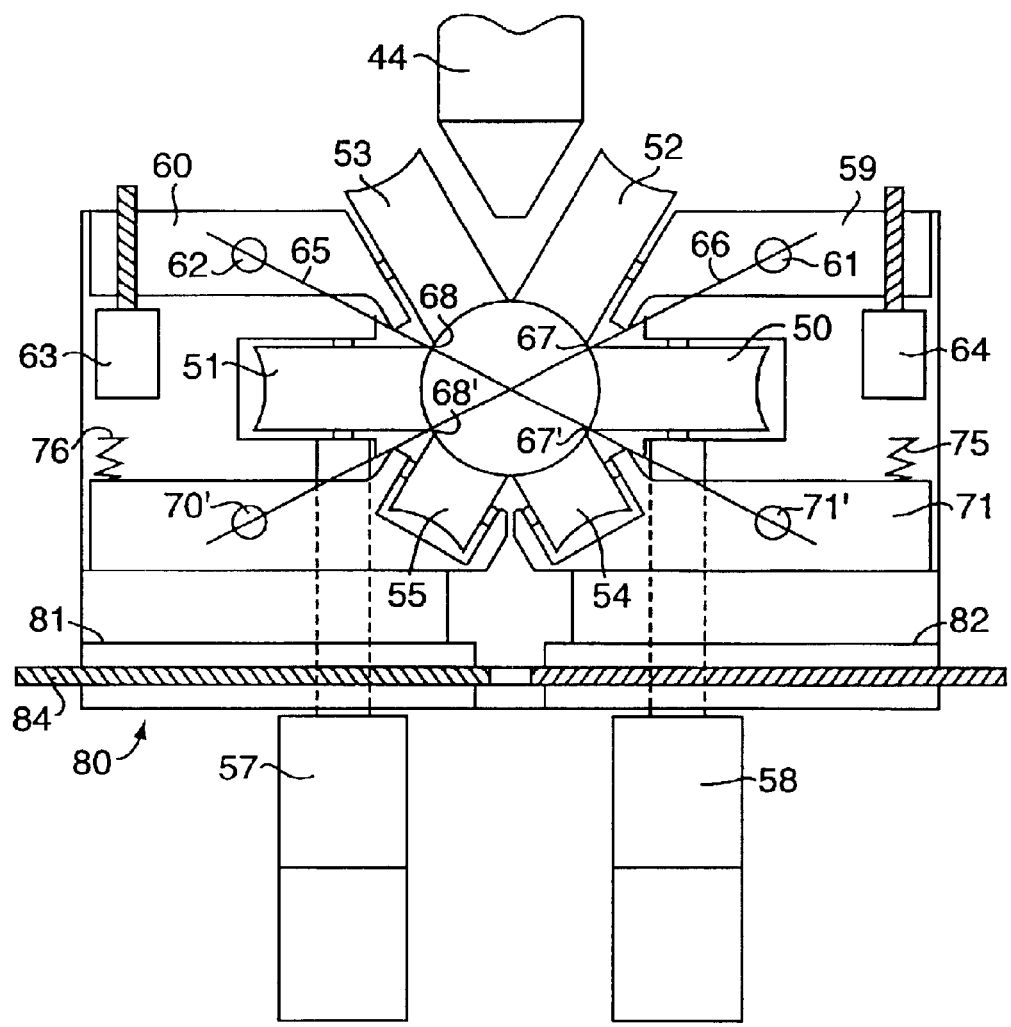
FIG. 5 is a frontal view of the feed through opening of a module of the welding tool.

FIG. 5 shows one module of the welding tool with a roller ring in a frontal view of its feed through opening. The rollers 50 to 55 form the roller ring. The individual rollers are waisted, so that they form a feed through profile matching the body. The rollers 50 and 51 which lie horizontally are driven by motors 58 and 57 in the illustrated example, to convey the body through the welding tool. The rollers 54 and 55 are mounted on carriers 70 and 71 which are pivotable about the pivot axes 70' and 71' respectively. The pivot axes 70' and 71' lie parallel with the longitudinal axis of the feed through opening formed by the rollers. In the example shown, the carriers 70 and 71 are acted on by springs 75 and 76 so that resilient pressure is applied by the rollers 54 and 55 to the tube body. This resilient pressure causes a closing of the gap on the opposite side of the body whereby any waviness of the edges can be evened out so as not to exceed the tolerance for the gap-opening at the welding point. Pressing with the rollers 54 and 55 can, however, cause V-shaped splaying of the gap, so pressure is preferably also exerted on the body with the rollers 52 and 53 to compensate for this. For this purpose the rollers 52 and 53 are likewise pivotable on carriers 59 and 60 about pivot axes 61 and 62, pivoting preferably being effected by drives 64 and 63 respectively, which are represented schematically in the drawing as motors with spindles. The pressure exerted on the body with the rollers 52 and 53 can thereby be controlled or regulated and/or applied in response to the sensor 43 so that a small-sized gap results. In order that damage to the body is reliably precluded when the rollers 52, 53 and also 54, 55 are tilted, they are arranged with their respective rims 67, 68 and 67', 68' lying in the plane which passes through the respective pivot axes and the longitudinal axis of the feed through opening. Lines denoting these planes are shown as the line 66 through the pivot axes 61 and 70' and the center of the feed through opening, for the rollers 52 and 55; and the line 65 for the pivot axes 62 and 71'. The aforementioned elements of the closing tool are arranged on an independent support 80 for each module. Each support 80 may be guided, and fixable in its position, in rails or on rollers on the machine frame. The individual modules can be quickly exchanged for different tube body diameters and adjusted by their interfaces, i.e., support plates 81,82 and spindle 84. The welding tool may close the edges of the bodies completely. As previously stated, it has a modular construction in the longitudinal direction with, according to requirements and/or sheet-metal properties, several modular units that can have different settings; and modules without pivotable rollers can also be provided. For example, a module can be used at the welding location to generate a transverse force acting on the edges by pressing down the edges with the corresponding rollers. It is practically possible to produce a nil gap between the edges at the location of the welding point, and the maximum tolerance of 0.08 mm for laser welding can easily be achieved. In particular, cutting variations are evened out. Instead of the three such modules shown in FIG. 1, more such modules can of course be arranged, especially for long tubes and large sheet-metal thicknesses. The welding tool modules also fulfil a transport function for the tube bodies that is independent of their length. It may also be advantageous from a transport aspect to connect several modules in series, depending on tube length and material. The individual modules can be adjustable to different body diameters, as suggested in FIG. 5 by the spindle 84 with which the two halves 81 and 82 of the support 80 can be displaced with respect to one another to form feed through openings of different diameters.

A module with driven rollers 50 and 51 can also be arranged after the welding point. This can be particularly advantageous where an optical inspection of the quality of the seam is made with a device 86 which reacts sensitively to variations in the conveyed height of the tube. The fully welded tube can then be conveyed out of the welding plant and stacked. A control 91 of the welding machine may operate in conjunction with the control 90 of the transfer apparatus.

None of the elements that have been described need necessarily be provided in a welding plant. For example, a run-in device may be omitted if the gap width of the tube as delivered by the transfer unit corresponds to the width on entry into the tool.

It would also be feasible for example to extend the tool and/or the roller bars 88 so that a tapering closure of the edges culminating in a butted position at the welding point is absolutely guaranteed. A welding tool proper might then be omitted.

Where, however, tubes of any desired length with properties making them difficult to weld are to be fabricated in large production runs and with an extremely low incidence of weld defects, an arrangement with run-in device, tool, welding tool and sensors will secure the desired result in terms of the quality of the welded seam, as the inevitable warping in the position of the edges can then be corrected.

Although this invention has been shown and described with respect to the detailed embodiments thereof, it will be understood by those skilled in the art that various changes in form and detail thereof may be made without departing from the spirit and scope of the invention.

What is claimed is:

1. Draw-in device characterized in that the device has drawing-in means, in particular draw-in rollers driven in rotation, which can be moved, driven to a receiving position to receive a tube body without making contact with it and can be moved towards each other by a predetermined amount, in a controlled manner, to contact the body in order to draw it in, sensing means for detecting a body, control means responding thereto, and actuating means controlled by the latter for moving the drawing-in means, being provided.

2. A draw-in device for a welding plant, comprising:

a plurality of draw-in rollers, each driven in rotation, which can be moved to a first position to receive a tube body without making contact with it, and can then be moved towards each other by a predetermined amount to a second position, to contact the body in order to draw it in;

sensing means for detecting the tube body;

control means responsive to the sensing means; and actuating means controlled by the control means for moving the draw-in rollers.

* * * * *